United States Patent [19]

Wright

[11] Patent Number: 4,758,971
[45] Date of Patent: Jul. 19, 1988

[54] DIGITAL SIGNAL GENERATOR

[75] Inventor: Charles S. Wright, Springfield, Va.

[73] Assignee: Delta Electronics, Inc., Alexandria, Va.

[21] Appl. No.: 604,910

[22] Filed: Apr. 27, 1984

[51] Int. Cl.[4] ............................................. G06F 1/02
[52] U.S. Cl. ................................................... 364/721
[58] Field of Search ...................... 364/718, 719, 721; 381/15, 16

[56] References Cited

U.S. PATENT DOCUMENTS

| | | | |
|---|---|---|---|
| 3,763,364 | 10/1973 | Deutsch et al. | 364/718 |
| 4,039,806 | 8/1977 | Fredriksso et al. | 364/721 |
| 4,134,072 | 1/1979 | Bolges | 364/721 |
| 4,171,466 | 10/1979 | Carbrey | 364/721 |
| 4,192,007 | 3/1980 | Becker | 364/721 |
| 4,225,936 | 9/1980 | Lesche | 364/718 |
| 4,267,579 | 5/1981 | Gross | 364/718 |
| 4,283,768 | 8/1981 | Scott | 364/718 |
| 4,382,160 | 5/1983 | Gosling et al. | 381/31 |
| 4,404,644 | 9/1983 | Howie | 364/718 |
| 4,475,244 | 10/1984 | Taylor | 387/16 |
| 4,476,536 | 10/1984 | Jones, Jr. | 364/721 |
| 4,511,862 | 4/1985 | Motiwalo et al. | 375/67 |
| 4,575,811 | 3/1986 | Hanmond et al. | 364/21 |

Primary Examiner—Gary V. Harkcom
Assistant Examiner—Dale M. Shaw
Attorney, Agent, or Firm—Neuman, Williams, Anderson & Olson

[57] ABSTRACT

Digital apparatus for generating a continuous signal waveform of a given carrier frequency fc. The apparatus comprises address circuit for generating repetitively a set of Z address signals and a memory in the form of a ROM for storing a set of Z digital values. The Z digital values define M number of cycles of the signal waveform, where M is a whole number. Each cycle of the signal waveform is defined by at least Y digital values, where Y is greater than 2. The carrier frequency fc is equal to the product of Y and M. The ROM is responsive to the address signals for repetitively reading out frm the ROM the Z digital values, whereby the continuous signal waveform is generated without discontinuity.

3 Claims, 3 Drawing Sheets

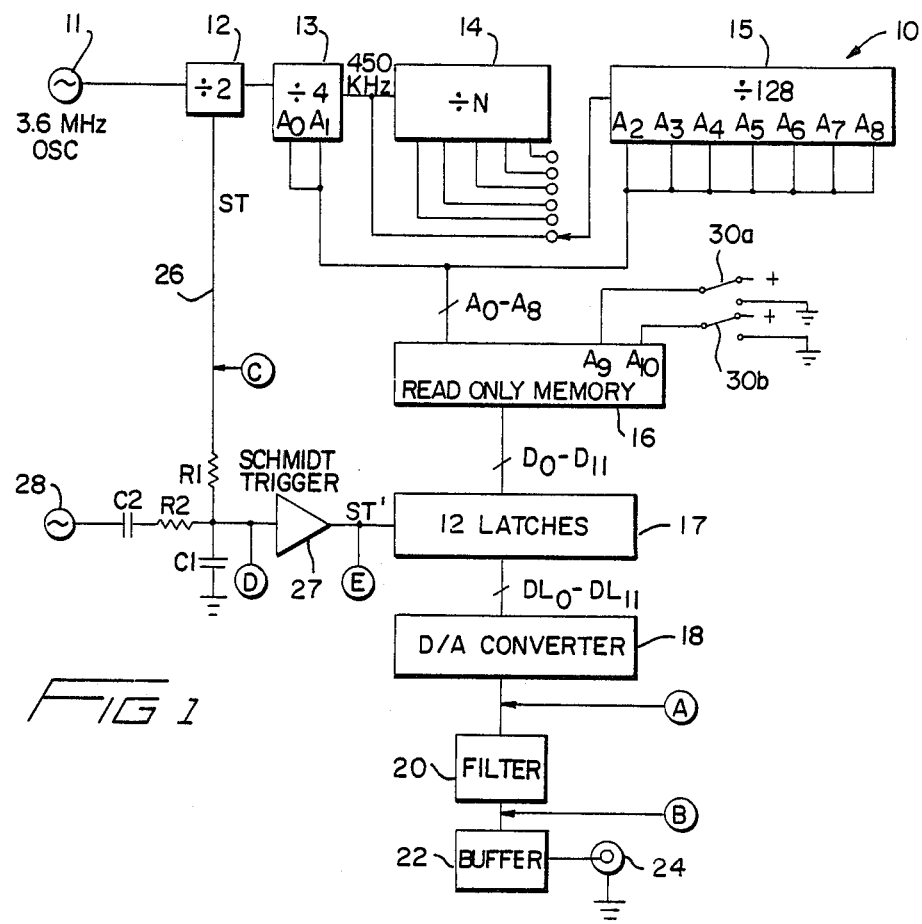

ducing test signals, and more particularly to apparatus for generating test signals providing a reference standard for test and inspection of compatible quadrature amplitude modulation stereo transmission and reception equipment and similar equipment having complex modulation schemes.

DIGITAL SIGNAL GENERATOR

BACKGROUND AND OBJECTS OF THE INVENTION

The present invention relates in general to waveform synthesizers for producing test signals, and more particularly to apparatus for generating test signals providing a reference standard for test and inspection of compatible quadrature amplitude modulation stereo transmission and reception equipment and similar equipment having complex modulation schemes.

In recent years, compatible quadrature amplitude modulation systems of stereo broadcasting, as marketed by Motorola, Inc. under their trademark "C-Quam", have begun to come into substantial commercial use. The "C-Quam" or compatible quadrature amplitude modulation system is a system of stereo broadcasting in which separate left and right stereo program information can be transmitted over ordinary AM broadcast stations and received in AM receivers equipped with a suitable decoder circuit. Also, ordinary receivers not so equipped with the decoder circuit can receive the program monaurally without serious distortion, and thus the system provides compatibility with ordinary AM receivers as well as the AM receivers equipped with the special decoder circuits. The "C-Quam" system is described in considerable detail in a number of Motorola, Inc. U.S. patents, including particularly U.S. Pat. Nos. 4,218,586 granted Aug. 19, 1980 and 4,338,491 granted July 6, 1982. Additional Motorola, Inc. patents describing the "C-Quam" system or components thereof include U.S. Pat. Nos. 4,159,396 and 4,159,398 granted June 26, 1979, 4,192,968 granted Mar. 11, 1980, 4,170,716 granted Oct. 9, 1979, 4,164,623 granted Aug. 14, 1979, 4,169,968 granted Oct. 2, 1979, 4,172,966 granted Oct. 30, 1979 and 4,371,747 granted Feb. 1, 1983.

The circuitry required to encode and decode the stereo program material is rather complex and requires critical tuning of many components. Both the encoder and the decoder must be so tuned. Ordinarily, under present practice they are tuned one against the other. It is not too difficult to obtain satisfactory encoding and decoding for the pair, but to my knowledge no direct and independent means have been developed to verify that the encoder generates the defined system signal. Presently, indirect means are used such as spectral analysis of the encoded signal to determine if the encoded signals are proper.

The equation for the compatible quadrature system or "C-Quam" system signal for the Motorola, Inc. system has been determined, the signal equation for such system being as follows:

$$E_c = A_c(1 + M_s(L(t) + R(t))\cos\left[\omega_c t + \tan^{-1}\left(\frac{M_d(L(t) - R(t) + .04\sin 50\pi t}{1 + M_s(L(t) + R(t))}\right)\right] \quad (1)$$

where:
$E_c$ = Complete "C-Quam" signal voltage for any time t
$A_c$ = Unmodulated carrier amplitude
$L(t)$ = Left channel program voltage at any time t
$R(t)$ = Right channel program voltage at any time t
$\omega_c = 2\pi f_c$, rad/sec
$f_c$ = Carrier frequency Hz
t = Time, sec.
$M_s$ = Modulation index for L+R program
$M_d$ = Modulation index for L−R program
$50\pi t$ = 25 Hz pilot tone The $E_c$ equation (1) shows that the carrier is amplitude modulated with the sum of the left and right program sources (L(t)+R(t)) and is phase modulated by the difference between the left and right program sources (L(t)−R(t)). Additionally, a pilot tone, which is the 50 $\pi$ t factor in the equation and in this embodiment is a 25 Hz pilot tone, of low level, phase modulates the carrier. The phase angle modulation is modified by the inverse tangent function ($\tan^{-1}$) to accomplish compatibility.

Observation of the equation (1) indicates that the generated signal is of a complex wave form. Present test signal generators utilizing analog elements experience troublesome stability problems. Thus, if such analog signal generators were used to generate a signal wave form in accordance with the "C-Quam" system signal equation, the generated test signal would drift and be distorted to such an extent that its use to test either an encoder or decoder would be impractical.

SUMMARY OF THE INVENTION

The present invention comprises a waveform synthesizer for generating a standard test signal which can serve as a reference standard for test and inspection of transmission and reception equipment for such "C-Quam" systems, which digitally generates standard encoded signals to serve as the test signals. The reference source for these signals is the defining mathematical equation of the system indicated above. The accuracy of the reference signals so generated can be determined from known characteristics of the generating system, such as quantizing errors and the like, all being selected and arranged to provide reference signals having accuracy of a high order of magnitude providing considerable improvement over the tuning methods hereinbefore ordinarily used. The apparatus of the present invention may be used by all manufacturers of transmission and reception equipment for such "C-Quam" systems to insure standardization, and although the equipment herein described is tailored for the "C-Quam" system, it is readily adaptable for modification to generation of standard test signals for other complex systems.

BRIEF DESCRIPTION OF THE FIGURES

Other objects, advantages and capabilities of the present invention will become apparent from the following detailed description, taken in conjunction with the accompanying drawings in which:

FIG. 1 is a generalized block diagaram of one embodiment of the test signal waveform generator of the present invention for producing test signals for a Compatible Quadrature AM stereo system;

FIGS. 2A through 2E illustrate representative waveforms at the locations A through E of FIG. 1, plotting signal amplitude against time;

DETAILED DESCRIPTION OF A PREFERRED EMBODIMENT

Figures 3, 4:
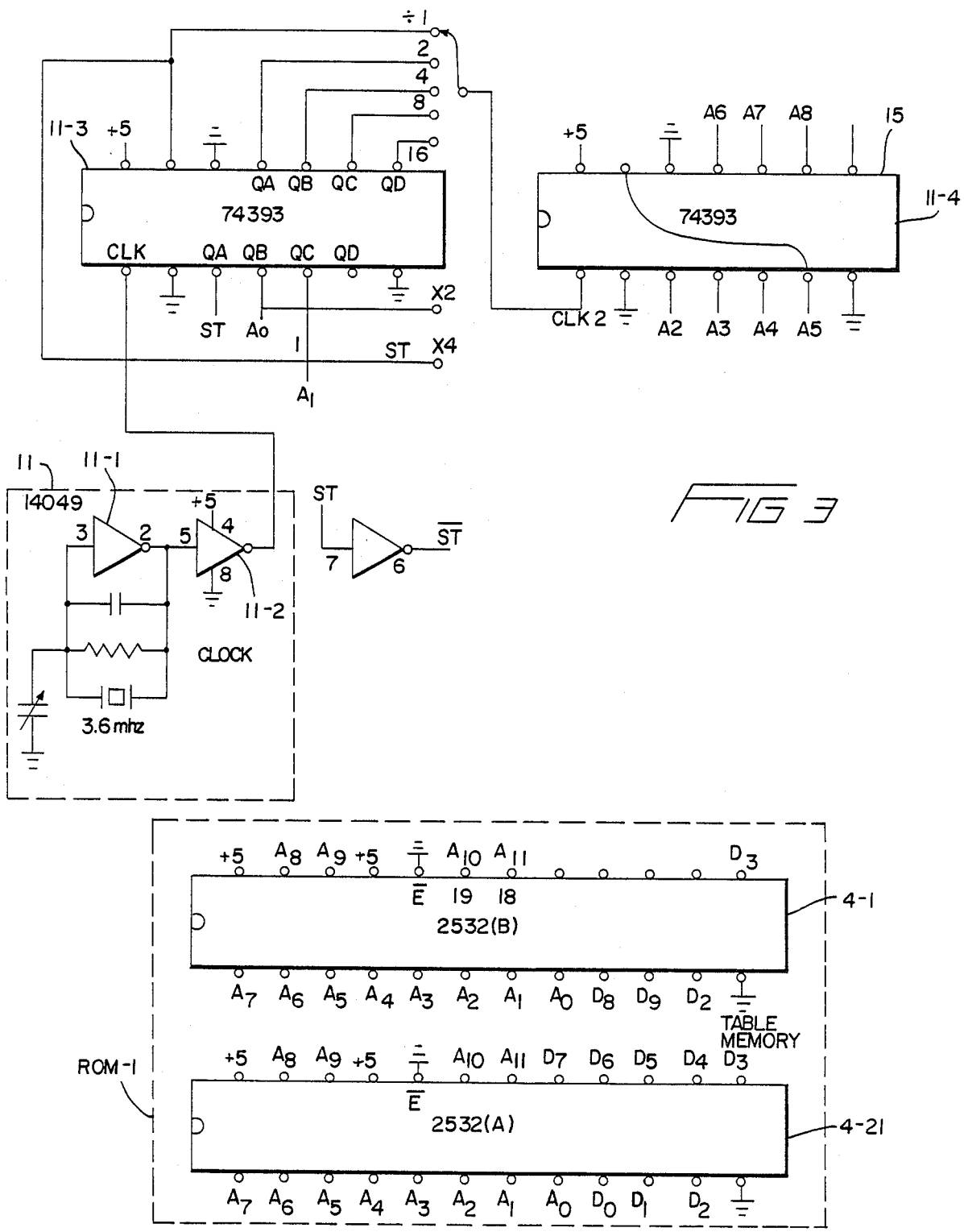
FIG. 3 is a schematic diagram illustrating circuitry which may be employed for the clock oscillator, divide-by-2, divide-by-4, divide-by-N, and divide-by-128 counters shown in FIG. 1, providing the address inputs for the read only memory.
FIG. 4 is a diagram showing the pin numbers and locations for address signal inputs and data outputs from a pair of programmable read only memory chips which may be used to form the read only memory of the signal generator of FIG. 1.

Referring to the drawings, wherein like reference characters designate corresponding parts throughout the several figures, the compatible quadrature AM stereo system test signal generator of the present invention is indicated generally by the reference character 10 and is designed, in the illustrated embodiment, to generate a plurality of distinct "C-Quam" test signals conforming to the equation (1) for the Motorola compatible quadrature AM stereo system, each test signal representative of a solution of the above equation for a particular set of parameters. The test signal has a carrier frequency of 450 KHz, corresponding to the intermediate frequency or IF section of such AM receivers. The modulation tones in the illustrated preferred example of this invention are produced by dividing 450 KHz signal by 128 to produce a modulation tone of 3.515625 KHz. The system may be implemented in one illustrative embodiment by a binary counter of nine stages having a $2^9=512$ division ratio. One bit of a binary address is derived from each stage of this nine-state binary counter, so that the address bits can sequentially address 512 bytes of a read only memory (ROM). The ROM stores a plurality of sets of complete solutions of the $E_c$ equation (1), each set of solutions for each set of parameters. The nine-stage counter addresses the ROM at regular time intervals of 555.55 NS to read out a train of 12 bit samples comprising a complete, continuous solution of the $E_c$ equation (1). Four samples solutions are stored for each carrier cycle. Each complete solution contains 512 samples and represents one complete modulation cycle. Continuously scanning the ROM produces a set of samples representing a continuous waveform as defined by the equation.

Referring to FIG. 1 illustrating a preferred example of the circuitry for the "C-Quam" test signal generator 10, the system includes a clock pulse generator 11 providing a 3.6 MHz train of clock pulses, which are applied to a divide-by-2 counter 12, producing a 1.8 MHz output, which also provides a strobe signal ST having one strobe pulse per sample. In the block diagram illustrated in FIG. 1, the 1.8 MHz signal output from the counter 12 is applied to a divide-by-4 counter 13 having two binary address bit outputs indicated at A0 and A1 in FIG. 1, to be applied to address inputs of a read only memory (ROM) 16. The 450 KHz output from the divide-by-4 counter 13 is applied to the input of a divide-by-N counter 14, whose function will be explained below, and to a divide-by-128 counter 15, which provides the binary address bit inputs A2, A3, A4, A5, A6, A7, and A8 to the ROM 16. The ROM 16 has a number of pages, each storing one complete set of solutions of the $E_c$ equation (1); each set comprises 512 12-bit samples which are read out one at a time on the output pins of the ROM 16. Each page of the ROM 16 is addressed by signals applied to the higher order address inputs A19 and A10 of the ROM 16. The page address signals A9 and A10 are selectively generated by closing one or both of a pair of switches 30a and 30b.

The 12-bit samples of the solution of the $E_c$ equation (1) are read out from outputs D0-D11 and applied to a circuit forming twelve latches, indicated at 17, to latch or temporarily store the 12 bits of a sample for the time period between strobe or clock pulses ST, as will be explained below in greater detail. The latched samples are then applied to a digital-to-analog (D/A) converter 18, which produces an analog signal of a stepped wave form, as shown in FIG. 2A. Each step of the analog signal is of an amplitude corresponding to the 12-bit word output by the ROM 16. The stepped signal of FIG. 2A is applied to a filter 20, which filters or smooths the input stepped signal to provide the filtered signal of FIG. 2B via a buffer amplifier 22 to an output signal terminal 24, upon which appears the desired test signal for the "C-Quam" system.

Since one carrier cycle includes four samples, the divide-by-4 counter 13 outputs upon the completion of a complete cycle a pulse corresponding to one cycle of carrier waveform at the IF frequency of 450 KHz. If, for example, an additional divide-by-N counter 14 is interposed between the divide-by-4 counter 13 and the divide-by-128 counter 15 and the divide-by-N counter 14 is set for N=2, it will take 1,024 counts to completely cycle the connected counters 13, 14 and 15. Thus, the generated signal will be apparently modulated at a frequency of 3.515625/2=1.5781 KHz. As suggested in FIG. 1, the divide-by-N counter 14 could be set for N=4, 8, 16, or 32, whereby the apparent frequency of modulation is divided by corresponding factors. Thus, it is apparent that the divide-by-N counter 14 may be used to provide address signals to a ROM 16 to repetitively address locations and to provide corresponding digital output signals to provide apparent modulation at lower frequencies without requiring a ROM of exceptionally large capacity.

As shown in FIG. 1, the 12-bit samples are read out from the ROM 16 and temporarily stored in the latches 17. The output of the divide-by-two counter 12 applies the 1.8 MHz strobe signal ST on a lead 26. The strobe signal ST, as shown in FIG. 2C, is applied via a Schmidt trigger 27 to the latches 17. The 12-bits of the output from the ROM 16 do not necessarily occur in unison and the latches 17 ensure that the 12-bits of the sample, as appears on the outputs DL0-DL11, are read out in unison in response to each pulse of the strobe signal ST.

The synthesized waveform representing the "C-Quam" system signal corresponding to the equation also requires a component representing the pilot signal required in the Motorola system, which is a very low frequency 25 Hz tone imposed on the L-R channel to let the receiver know that stereo information is being transmitted. One complete cycle of this tone requires 1/25 second or 72000 samples at the 1.8 MHz sampling rate. To directly synthesize this signal, a very large memory and counter chain would be required. For example, a test signal modulated at 1000 cycles per second and having a carrier frequency of 450 KHz, requires 450 carrier cycles per modulation or 4×450 samples or digital values to be stored in the ROM 16. As the frequency of the modulation decreases, the size of the required ROM 16 increases. For example, it is desired to modulate a signal with a carrier frequency of 450 KHz with modulation of 100 cycles per second, there would be required to store four samples for each of 4,500 cycles or a memory 10 times greater than that required for the desired modulation of 1000 cycles per second.

However, since the pilot tone is in the phase term of the equation and the phase shifts associated with it are small, this signal can be artificially introduced, as will be described. Referring to FIG. 1, the low frequency pilot tone, e.g., 25 Hz, is generated by an oscillator 28 and is used, as will now be explained, to phase shift the 12-bit output signal derived from the latches 17. As indicated above, the strobe signal ST, as seen in FIG. 2C, serves to latch the latches 17. In particular, the square wave strobe signal ST, as shown in FIG. 2C, is applied via lead 26 to an integrator comprised of resistor R1 and capacitor C1. Since the capacitor C1 requires a finite time to charge, the voltage appearing on the capacitor C1, as shown in FIG. 2D, has sloped leading and trailing edges corresponding to the charging time of capacitor C1. The signal developed on capacitor C1 is applied to the Schmidt trigger circuit or comparator 27 which fires when the input signal rises above a predetermined trigger voltage, e.g., one half of the final amplitude of the input signal. The 25 Hz output of the oscillator 28 is coupled by capacitor C2 and resistor R2 to the capacitor C1, whereby the negative and positive going 25 Hz signal is added to or subtracted from the signal stored on capacitor C1, as suggested by the dotted lines of FIG. 2D. Thus, if the voltage level of the signal appearing on capacitor C1 is increased, the Schmidt trigger 27 will fire at a point earlier in time and, if a negative voltage is applied to capacitor C1, the Schmidt trigger 27 will fire at a point later in time. The latching output signal ST' derived from the schmidt trigger 27, as shown in FIG. 2E, is either slightly advanced or slightly retarded, whereby the latches 17 are strobed earlier or later, resulting in the desired phase modulation of the output signal by 25 Hz power tone, as shown in FIGS. 2A and 2B.

FIG. 1 discloses digital apparatus for generating a signal of a defined waveform at a given carrier frequency. As explained above, the signal generator 10 may generate a signal whose wave form is defined by the $E_c$ equation (1) given above. It is desired that the waveform of such a signal be continuous in that there is no discontinuity in the amplitude of the waveform as defined by the sequence of digital signals or samples. To generate a continuous signal, i.e., a signal without discontinuities in its wave form, it is necessary to calculate a set of digital values corresponding to a whole number of cycles of the signal to be so generated. The Nyquist theory requires that two or more samples of each cycle of the signal be taken to define its wave form. Thus, where you have M whole cycles, M being a whole integer, and have taken N greater than 2 samples per cycle, the ROM 16 must have a capacity for storing a number of digital samples equal to the product of M and N. The ROM 16 is addressed by the counter comprised of the divide-by-four counter 13 and the divide-by-128 counter 15, which is incremented at a sampling rate selected to generate the signal wave form of the desired carrier frequency. Thus, the carrier frequency $f_c$ is defined as the quotient of the sampling frequency and the number of whole cycles. In the illustrative embodiment, described with respect to FIG. 1, the signal appearing at the output terminal 24 has a carrier frequency fc of 450 KHz, where four samples of the waveform are taken per cycle and the sampling frequency is selected as 1.8 MHz. In the example described above, the composite counter, comprised of counters 13 and 15, counts from 0 to 511 before recycling to count over again. Each of the 0 to 511 addresses a corresponding digital value as stored in the ROM 16. By so selecting the samples per cycle, the number of whole cycles and carrier frequency, the digital value read out in response to a count of 511 is made continuous with the next digital value read out in response to a zero address.

Referring to FIG. 3, there is shown a schematic diagram of an example of circuitry which may be employed, in the presently preferred embodiment, for providing the oscillator 11, the divide-by-2 counter 12, the divide-by-4 counter 13, the divide-by-N counter 14 and the divide-by-128 counter 15 of the FIG. 1 generalized block diagram. The 3.6 MHz oscillator 11 may be formed from an integrated circuit chip, such as a 14049 chip, providing amplifier stages 11-1 and 11-2 connected as illustrated in FIG. 3 with capacitor and resistor elements to provide the 3.6 MHz clock pulse output to the clock input of an integrated circuit such as indicated at 11-3 which may be a 74393 integrated circuit. The integrated circuit 11-3 forms the counters 12, 13 and 14, as shown in FIG. 1. The pin $Q_a$ along the lower edge of the chip 11-3 provides the strobe signal ST on the lead 26 of FIG. 1, while the pins $Q_b$ and $Q_c$ the address bits appearing on the leads $A_0$ and $A_1$ of the divide-by-4 counter 13 of FIG. 1. The outputs from the pins $Q_A$-$Q_D$ of the integrated circuit 11-3 provide the divided output signals from the divide-by-N counter 14 to be applied to the clock input of the divide-by-128 counter 15, which illustratively takes the form of a 74393 integrated circuit chip 11-4. The integrated circuits 11-4 and 11-3 provide address signals from their respective outputs A0 and A1 and A2-A8 to the similarly designated address input pins $A_0$-$A_8$ of the ROM 16, as shown in FIG. 1.

As shown in FIG. 4, the ROM 16 may be illustratively formed of two 2532 integrated circuits indicated by reference characters 4-1 and 4-2, having address signal input pins designated and data output signal pins designated $D_0$-$D_{11}$. As previously described, in this illustrated embodiment, the ROM 16 formed by the integrated circuits 4-1 and 4-2 is programmed to have stored therein a plurality of sets of solutions to the above equation for a plurality of corresponding sets of parameters. Each set of solutions provides four time intervals for each carrier frequency cycle, at time intervals of 555.55 NS, which are provided to the data output pins $D_0$-$D_{11}$ in the form of a twelve bit solution for each sampling time.

Figure 5:
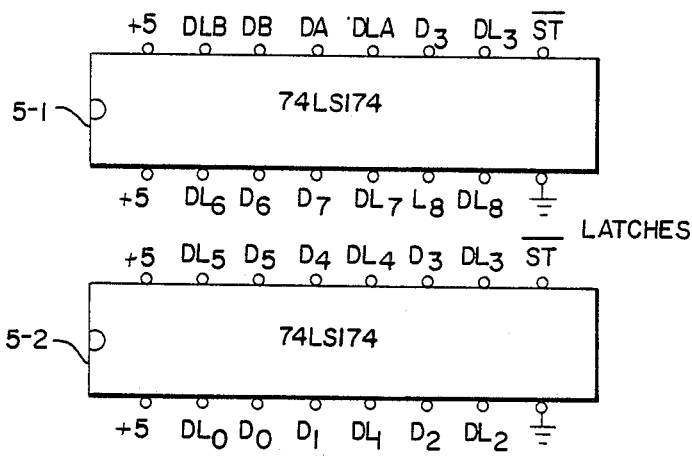
FIG. 5 is a pin numbered diagram of the integrated circuit chips forming the twelve latches in one embodiment of the signal generator of FIG. 1.

Since the ROM 16 cannot provide concurrently each bit of its 12-bit output word, the latches 17 are provided, which may be formed of two 74LS174 integrated circuits, having terminals, as indicated in FIG. 5, providing data signal inputs on the terminals $D_0$-$D_{11}$ and latched data output signals on terminals $DL_0$-$DL_{11}$ in the required concurrent relation, and having outputs from the Schmidt trigger circuit 27 of FIG. 1 applied to the ST pin. The voltage supplied from the Schmidt trigger 27 to the ST pin of the latch integrated circuits 5-1 and 5-2 cause the latches 17 to present the memory data a little later or a little sooner to the D/A converter 18, resulting in the phase modulation of the synthesized output waveform, as explained above.

Figure 6:
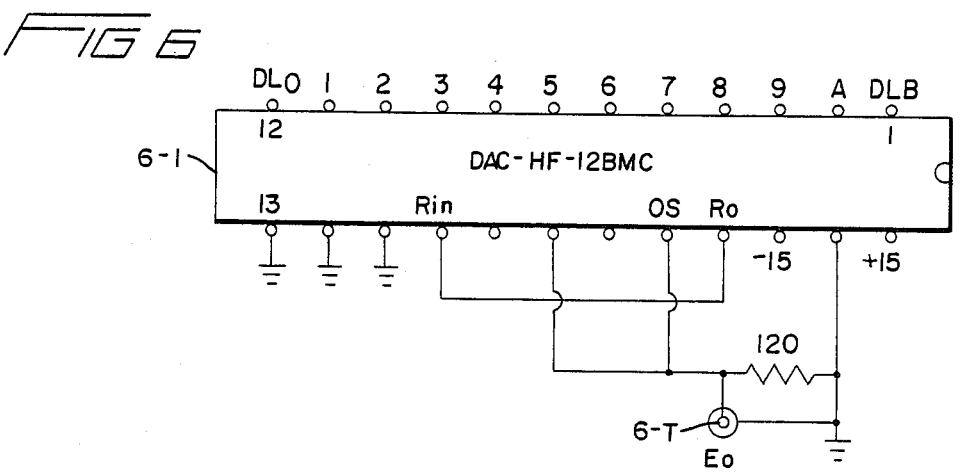
FIG. 6 is a pin numbered diagram of the digital-to-analog converter which may be used in one embodiment of the signal generator of FIG. 1.
Figure 7:
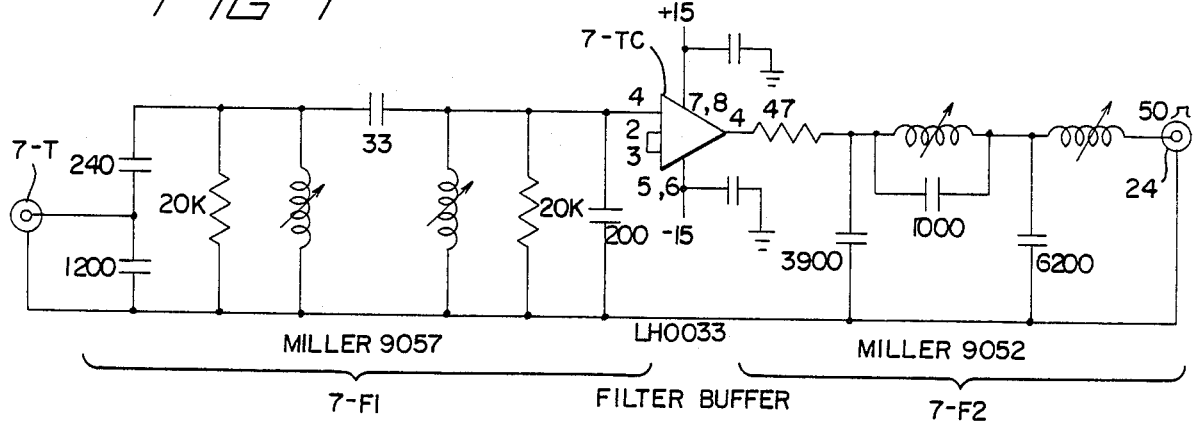
FIG. 7 is a schematic diagram of a filter buffer circuit which may be used to form the filter and buffer blocks of the signal generator of FIG. 1.

As shown in FIG. 6, the D/A converter 18 may be an integrated circuit 6-1 such as the model DAC-HF-12 BMC marketed by Datel-Intersil, Inc. of Mansfield, Mass. The circuit 6-1 receives latched data signal inputs to its pins $DL_0$ to $DL_{11}$ and output pins providing the output signals shown in FIG. 2A to an output terminal 6-T, which is connected to the filter 20 and buffer, as shown generally in FIG. 1, and to an input terminal 7-T of the filter buffer circuit shown in detail FIG. 7. The filter buffer circuit of FIG. 7, which is a presently preferred example of the circuitry for providing the filter 20 and buffer 22 of FIG. 1, includes capacitors, resistors and inductors interconnected as shown in FIG. 7 to provide a double tuned band pass filter section indicated at 7-F1 in FIG. 7, centered on a carrier frequency fc of 450 KHz. The output of the filter section 7-F1 is coupled to an LH0033 integrated circuit 7-IC. The output from the pin 4 of the integrated circuit 7-IC is then applied through a low pass filter indicated by reference character 7-F2 formed of resistors, capacitors and tuned inductors to provide a low pass filter to take all the harmonics out of the signal and provide the filtered and buffered output to the output terminal 24.

Though the signal generator 10 of this invention is capable of generating digital signals according to any wave form, a description of a particular embodiment of this invention will be set out for generating desired test signals in accordance with the signal $E_c$ equation (1), stated above, for the "C-Quam" system. In considering the $E_c$ equation (1), the maximum amplitude of $E_c$, i.e., the solution of equation (1), must be selected in view of the dynamic range of the D/A converter 18. In the illustrative embodiment given above with respect to FIGS. 1 and 6, the D/A converter 18 has a 12-bit capacity, i.e., the D/A converter 18 is capable of representing numbers as high as $2^{12}$ or 4096. Thus, $E_c$ must lie between 0 and 4095. Further examining the $E_c$ equation (1), it is seen that the amplitude modulation term $[(1+M_s(L(t)+R(t))]$ can vary from 0 to 2 for 100 percent modulation. The term $\cos(\omega_c t + \phi)$ representing the RF carrier can vary from $-1$ to $+1$. The particular D/A converter 18 is not capable of representing negative numbers; thus, a DC offset is imparted to the solution $E_c$, i.e., 2048 is added to the digital signal applied to the D/A converter 18, which is removed by analog circuitry after the D/A conversion. The parameter Ac is chosen to be 1023 in view of the above considerations.

The carrier frequency fc for the "C-Quam" test signal is selected to be 450 KHz and in accordance with the Nyquist theory, four solutions or samples per carrier cycle are taken. Thus, the sampling rate is 4×450 KHz or 1.8 MHz. In order to generate a series of digital signals representing a continuous wave form, a set of digital values must be calculated corresponding to a whole number M of cycles, e.g., 128, where M is a whole integer. Thus, if there are four samples or solutions per cycle, 512 digital solutions will be stored in the ROM 16, and the address means for the signal generator 10, comprising as shown in FIG. 1 as the divide-by-four counter 13 and the divide-by-128 counter 15, must be capable of generating address signals from 0 to 511. In order to take four samples or solutions per carrier cycle, $\omega_c$ is chosen to be $2\pi/4$. For test purposes, the modulation signals L(t) and R(t) are selected as sinusoidal tones in the form of:

$$L(t) = 0.5 \sin(\omega s t)$$

and (2)

$$R(t) = 0.5 \sin(\omega s t + \alpha)$$

In the above expression of the sinusoidal tones, $\alpha$ represents the phase relation of the right channel tone or signal to the left channel signal. Normally, $\alpha$ is equal to zero. If the modulation signals vary at a rate of one cycle per set of solutions, $\omega s$ is selected as $2\pi/512$. By definition, the modulation indexes $M_s$ and $M_d$ are set equal to each other for the "C-Quam" system.

In the following, five different equations will be developed that may be solved for values of t from 0 to 511 to generate test signals for the "C-Quam" system. In the first example, it is desired to provide a test signal where the left and right modulation tones are 100 percent amplitude modulated and monophonic transmission is desired, i.e., the left modulation signal is equal to the right modulation signal. Thus, the $E_c$ equation (1) for the "C-Quam" system, under these conditions, may be represented as:

$$E_c = 1023\left[1 + 1\left(.5\sin\frac{2\pi t}{512} + .5\sin\frac{2\pi t}{512}\right)\right]\cos\left(\frac{2\pi t}{4} + \phi\right) + 2048 \quad (3)$$

$$\text{where } \phi = \tan^{-1}\left\{\frac{1\left(.5\sin\frac{2\pi t}{512} - .5\sin\frac{2\pi t}{512}\right)}{1 + 1\left(.5\sin\frac{2\pi t}{512} + .5\sin\frac{2\pi t}{512}\right)}\right\} = 0$$

In the above developed equation (3), the term $0.04 \sin 50\pi t$ is omitted in that the phase modulation is generated separately by employing the oscillator 28, as shown in FIG. 1.

A second test signal may be generated similar to that of equation (3) above, where it is desired to achieve 50 percent amplitude modulation for a monophonic signal, i.e., the left modulation signal is equal to the right modulation signal. In that case, equation (3) is varied by inserting 0.5 for each of the values $M_d$ and $M_s$.

In a third example, it is desired to generate a "C-Quam" system signal for 100 percent quadrature modulation, i.e., the left sinusoidal signal is equal to the negative value of the right sinusoidal signal. Under such conditions, the system signal equation $E_c$ may be represented as follows:

$$E_c = 1023\left[1 + 1\left(.5\sin\frac{2\pi t}{512} - .5\sin\frac{2\pi t}{512}\right)\right]\cos\left(\frac{2\pi t}{4} + \phi\right) + 2048 \quad (4)$$

$$\text{where } \phi = \tan^{-1}\left\{\frac{1\left(.5\sin\frac{2\pi t}{12} + .5\sin\frac{2\pi t}{12}\right)}{1 + 1\left(.5\sin\frac{2\pi t}{12} - .5\sin\frac{2\pi t}{12}\right)}\right\} \neq 0$$

In a fourth example, a test signal is developed for the "C-Quam" system where only the left sinusoidal signal is generated and it is 50 percent amplitude modulated. Under such conditions, the test signal $E_c$ is represented as:

For t=0 to 511

$$E_c = 1023\left[1 + 1\left(.5\sin\frac{2\pi t}{512}\right)\right]\cos\left(\frac{2\pi t}{4} + \phi\right) + 2048 \quad (5)$$

$$\text{where } \phi = \tan^{-1}\left\{\frac{1\left(.5\sin\frac{2\pi t}{512}\right)}{1 + 1\left(.5\sin\frac{2\pi t}{512}\right)}\right\} \neq 0$$

For a fifth, similar test signal, where it is desired to only generate the right sinusoidal signal at 50 percent modulation, the test signal $E_c$ may be represented as:

For t=0 to 511

$$E_c = 1024\left[1 + 1\left(.5\sin\frac{2\pi t}{512}\right)\right]\cos\left(\frac{2\pi t}{4} + \phi\right) + 2048 \quad (6)$$

$$\text{where } \phi = \tan^{-1}\left\{\frac{1\left(-.5\sin\frac{2\pi t}{512}\right)}{1 + 1\left(.5\sin\frac{2\pi t}{512}\right)}\right\} \neq 0$$

It is understood that each of the above set out equations 2 through 5 are solved to provide a set of digital values for t=0 to 111 and that each of these five sets of values may be stored in the ROM 16 on distinct addressable pages. As shown in FIGS. 1 and 3, switches 30a and 30b may be selectively closed to apply address signals to the high order inputs A9 and A10 of the ROM 16, whereby a corresponding page of the ROM 16 is addressed to generate a test signal corresponding to the addressed set of digital values.

In considering this invention, it should be remembered that the present disclosure is illustrative only and the scope of the invention should be determined solely by the appended claims.

I claim:

1. Digital apparatus for generating a modulated signal as a continuous waveform and of a given carrier frequency, said apparatus comprising;
    (a) address means for generating repetitively a set of Z address signals, said address means comprises clock means for generating a train of regular clock signals Y of a given clock frequency, and counter means for receiving and counting said train of clock signals from an initial value X to a final value X+Z to provide said address signals; and
    (b) memory means having a capacity of at least Z storage locations for storing in corresponding ones of said storage locations a set of Z digital values indicative of the amplitude of said waveform, said Z digital values defining M number of cycles of said modulated signal, M being a whole number and greater than one, each cycle of said modulated signal being defined by at least Y digital values, Y being two or greater, said memory means responsive to said Z addresses for repetitively producing said digital values whereby said waveform is generated without discontinuity;
    (c) said counter means comprising first counter means for counting said train of clock signals to provide said address signals and responsive to each Y clock signals to provide a second clock signal, said first counter having P number of stages, $P^2$ being equal to Y, divider means for receiving a train of said second clock signals and providing a third clock signal for each N of said second clock signals, said Z digital values is set at N, and second counter means for receiving and counting said third clock signals to provide the high order bits of said address signals, said divider means is adjustable to divide said second clock signal by a selected one of a plurality of values of N, whereby said signal waveform is modulated at a selected frequency determined as N/Y.

2. Digital apparatus for generating a modulated signal as a continuous waveform and of a given carrier frequency, said waveform comprised of at least two modulation cycles, each modulation cycle comprised of M carrier cycles, said apparatus comprising;
    (a) address means for generating repetitively a set of Z address signals; and
    (b) memory means having a capacity of at least Z storage locations for storing in corresponding ones of said storage locations a set of Z digital values indicative of a modulated characteristic of said waveform, said Z digital values defining M number of said carrier cylces of said modulated signals, M being a whole number and greater than one, each carrier cycle of said modulated signal being defined by at least Y digital values, Y being two or greater, said memory means responsive to said set of Z addresses for repetitively producing said digital values whereby consecutive modulation cycles are generated without discontinuity;
    (c) said address means comprising clock means for generating a train of regular clock signals of a given clock frequency and counter means for receiving and counting said train of clock signals from an initial value X to a final value X+Z to provide said address signals to said memory means, said counter means comprising first counter means for counting said train of clock signals to provide R low order bits of said address signal and responsive to each $2^R$ clock signals to provide a second clock signal and second counter means for receiving and counting said second clock signals for providing S high order bits of said address signal.

3. Digital apparatus for generating a modulated signal as a continuous waveform and of a given carrier frequency, said waveform comprised of at least two modulation cycles, each modulation cycle comprised of M carrier cycles, said apparatus comprising:
- (a) address means for generating repetitively a set of Z address signals; and
- (b) memory means having a capacity of at least Z storage locations for storing in corresponding ones of said storage locations a set of Z digital values indicative of a modulated characteristic of said waveform, said Z digital values defining M number of said carrier cycles of said modulated signals, M being a whole number and greater than one, each carrier cylce of said modulated signal being defined by at least Y digital values, Y being two or greater, said memory means responsive to said set of Z addresses for repetitively producing said digital values whereby consecutive modulation cycles are generated without discontinuity;
- (c) said address means comprising clock means for generating a train of regular clock signals of a given clock frequency and counter means for receiving and counting said train of clock signals from an initial value X to a final value X+Z to provide said address signals to said memory means, said counter means comprising first counter means for counting said train of clock signals to provide said address signal and responsive to each Y clock signal to provide a second clock signal, said first counter having P number stages, P2 being equal to Y, divider means for receiving a train of said second clock signals and providing a third clock signal for each N of said second clock signals, said Z digital values is set at N, and second counter means for receiving and counting said third clock signals to provide the high order bits of said address signals, whereby said signal waveform is modulated at a frequency determined as N/Y.

* * * * *